(12) United States Patent
Garudadri et al.

(10) Patent No.: US 8,089,948 B2
(45) Date of Patent: Jan. 3, 2012

(54) HEADER COMPRESSION OF MULTIMEDIA DATA TRANSMITTED OVER A WIRELESS COMMUNICATION SYSTEM

(75) Inventors: Harinath Garudadri, San Diego, CA (US); Phoom Sagetong, San Diego, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 11/129,735

(22) Filed: May 13, 2005

(65) Prior Publication Data

US 2005/0259690 A1 Nov. 24, 2005

Related U.S. Application Data

(60) Provisional application No. 60/571,673, filed on May 13, 2004.

(51) Int. Cl.
*H04J 3/24* (2006.01)
*H04W 4/00* (2009.01)

(52) U.S. Cl. ........................ 370/349; 370/229; 370/230.1

(58) Field of Classification Search ................... 370/253, 370/349, 389, 392, 471, 474
See application file for complete search history.

(56) References Cited

U.S. PATENT DOCUMENTS

| | | | |
|---|---|---|---|
| 5,541,852 A * | 7/1996 | Eyuboglu et al. ............. | 709/232 |
| 5,559,608 A | 9/1996 | Kunihiro | |
| 5,570,372 A | 10/1996 | Shaffer | |
| 5,583,652 A | 12/1996 | Ware | |
| 5,717,464 A | 2/1998 | Perkins et al. | |
| 5,729,534 A | 3/1998 | Jokinen et al. | |
| 5,844,600 A | 12/1998 | Kerr | |
| 5,867,230 A | 2/1999 | Wang et al. | |
| 5,898,695 A | 4/1999 | Fujii et al. | |

(Continued)

FOREIGN PATENT DOCUMENTS

EP 1564992 8/2005

(Continued)

OTHER PUBLICATIONS

Formulasys, The Basics of Wireless, Dec. 21, 2003, Formulasys.com, all pages.*

(Continued)

*Primary Examiner* — Kwang B Yao
*Assistant Examiner* — Adam Duda
(74) *Attorney, Agent, or Firm* — Donald C. Kordich

(57) ABSTRACT

Methods and apparatus are described for improving the transmission of multimedia data over wireless communication channels. These techniques include determining a physical layer packet size of the wireless communication system and determining a maximum size of a compressed header. Then, partitioning an information unit, wherein the size of the partitions are selected such that after a partition is encoded the aggregate size of the encoded partition and the compressed header are the size of the physical layer packet, or less. The techniques can be used for various types of information units, such as multimedia data, variable bit rate data streams, video streams, video teleconference stream, or voice over IP. The techniques can also be used with various over the air interfaces, such as, Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRDP, cdma2000, Wideband CDMA (WCDMA), and others.

45 Claims, 12 Drawing Sheets

U.S. PATENT DOCUMENTS

| | | | |
|---|---|---|---|
| 6,023,552 | A | 2/2000 | Kunihiro |
| 6,041,067 | A | 3/2000 | Takamori et al. |
| 6,058,141 | A * | 5/2000 | Barger et al. ............... 375/240 |
| 6,085,270 | A | 7/2000 | Gulick |
| 6,108,626 | A * | 8/2000 | Cellario et al. ............ 704/230 |
| 6,181,711 | B1 | 1/2001 | Zhang et al. |
| 6,473,442 | B1 | 10/2002 | Lundsjo |
| 6,535,043 | B2 * | 3/2003 | Chen .......................... 327/291 |
| 6,536,043 | B1 | 3/2003 | Guedalia |
| 6,542,481 | B2 | 4/2003 | Foore et al. |
| 6,564,382 | B2 | 5/2003 | Duquesnois et al. |
| 6,584,125 | B1 | 6/2003 | Katto |
| 6,647,006 | B1 | 11/2003 | Rasanen |
| 6,680,955 | B1 | 1/2004 | Le |
| 6,704,281 | B1 | 3/2004 | Hourunranta et al. |
| 6,891,854 | B2 | 5/2005 | Zhang et al. |
| 6,920,118 | B2 | 7/2005 | Lozano |
| 6,956,875 | B2 | 10/2005 | Kapadia et al. |
| 6,968,091 | B2 | 11/2005 | Faibish et al. |
| 7,016,337 | B1 | 3/2006 | Wu et al. |
| 7,043,749 | B1 | 5/2006 | Davies |
| 7,068,708 | B2 | 6/2006 | LaRosa et al. |
| 7,391,717 | B2 | 6/2008 | Klemets et al. |
| 7,453,843 | B2 | 11/2008 | Mowery et al. |
| 2001/0008535 | A1 | 7/2001 | Lanigan |
| 2002/0137521 | A1 | 9/2002 | Kim et al. |
| 2002/0159457 | A1 * | 10/2002 | Zhang et al. ................ 370/391 |
| 2002/0194606 | A1 | 12/2002 | Tucker et al. |
| 2003/0021298 | A1 | 1/2003 | Murakami et al. |
| 2003/0140347 | A1 | 7/2003 | Varsa |
| 2003/0208615 | A1 | 11/2003 | Rousseau et al. |
| 2003/0224806 | A1 | 12/2003 | Hebron |
| 2004/0052209 | A1 | 3/2004 | Ortiz |
| 2004/0057446 | A1 | 3/2004 | Varsa et al. |
| 2004/0078744 | A1 | 4/2004 | Wei et al. |
| 2004/0264489 | A1 * | 12/2004 | Klemets et al. ............... 370/428 |
| 2005/0047417 | A1 | 3/2005 | Lee et al. |
| 2005/0094655 | A1 | 5/2005 | Newson et al. |
| 2005/0172154 | A1 | 8/2005 | Short et al. |
| 2005/0226262 | A1 | 10/2005 | Hsieh et al. |
| 2005/0259613 | A1 | 11/2005 | Garudadri et al. |
| 2006/0285654 | A1 | 12/2006 | Nesvadba et al. |
| 2008/0002669 | A1 | 1/2008 | O'Brien et al. |

FOREIGN PATENT DOCUMENTS

| | | |
|---|---|---|
| JP | 2000-196634 | 7/2000 |
| JP | 2004226272 | 8/2004 |
| KR | 1997012585 | 3/1997 |
| KR | 20010024530 | 4/2000 |
| KR | 20010024531 | 4/2000 |
| KR | 20020044169 | 4/2002 |
| KR | 20030088054 | 11/2003 |
| WO | WO95028684 | 10/1995 |
| WO | 0021321 | 4/2000 |
| WO | 0078054 | 12/2000 |
| WO | 0152553 | 7/2001 |
| WO | 0152565 | 7/2001 |
| WO | 02005575 | 1/2002 |
| WO | 0215591 | 2/2002 |
| WO | 0223745 | 3/2002 |
| WO | 0223916 | 3/2002 |
| WO | 04036816 | 4/2009 |

OTHER PUBLICATIONS

Jonsson, Zero-Byter ROHC RTP, Mar. 23, 2001, IETF, all pages.*
Borman, "Robust Header Compression (ROHC)", RFC 3095, Jul. 2001.*
Kunhiro H, "Data Recording System using CD-ROM has frame constituting . . . ", EP 424903 A.*
Eyuboglu M, "Device, Method and System for variable Bit-Rate Packet Video Communications", WO 9528684.*
Garudadri, "Video Transport Over Wireless Networks", 2004, ACM, all pages.*
Svanbro, K., "Lower Layer Guidelines for Robust RTP/UDP/IP Header Compression", *IETF Standard, Internet Engineering Task Force*, IETF, CH, Dec. 2002, XP015009203.
Formulasys, The Basics of Wireless, 2002.
Zero-byte ROHC RTP, Ericsson Research, Lulea Sweden, Lars-Erik Jonsson, Mar. 23, 2001.
Networking Working Group, K. Svanbro, 3409 Ericsson, Lower Layer Guidelines for Robust RTP/UDP/IP Header Compression, Dec. 2002.
International Preliminary Report on Patentability—PCT/US05/016831—International Preliminary Examining Authority—United States Office—May 24, 2007.
International Search Report—PCT/US05/016831, International Search Authority-European Patent Office—Sep. 16, 2005.
Written Opinion—PCT/US05/016831, International Search Authority—European Patent Office—Sep. 16, 2005.
3GPP TS 45.002 , V6.9.0 (Apr. 2005); 3rd Generation Partnership Project; Technical Specification Group GSM/Edge Radio Access Network; Multiplexing and multiple access on the radio path (Release 6).
European Search Report—EP10182418, Search Authority—The Hague Patent Office, Nov. 4, 2010.
Taiwanese Search report—094115718—TIPO—Oct. 4, 2010.
Kikuchi, et al., "RTP Payload Format for MPEG-4 Audio/Visual Streams," Network Working Group, RFC 3016, Nov. 2000, 20 pp.
Schulzrinne, et al., "RTP: A Transport Protocol for Real-Time Applications," IETF RFC 3550 (Jul. 2003).

* cited by examiner

HEADER COMPRESSION OF MULTIMEDIA DATA TRANSMITTED OVER A WIRELESS COMMUNICATION SYSTEM

CLAIM OF PRIORITY UNDER 35 U.S.C. §119

The present application for patent claims priority to U.S. Provisional Application No. 60/571,673, entitled "Multimedia Packets Carried by CDMA Physical Layer Products", filed May 13, 2004, and assigned to the assignee hereof and hereby expressly incorporated by reference herein

REFERENCE TO CO-PENDING APPLICATIONS FOR PATENT

The present application for patent is related to the following co-pending U.S. patent applications:

"Delivery Of Information Over A Communication Channel", Ser. No. 11/129,625, filed concurrently herewith, assigned to the assignee hereof, and expressly incorporated in its entirety by reference herein;

"Method And Apparatus For Allocation Of Information To Channels Of A Communication System", having Ser. No. 11/129,687, filed concurrently herewith, assigned to the assignee hereof, and expressly incorporated in its entirety by reference herein; and "Synchronization Of Audio And Video Data In A Wireless Communication System", Ser. No. 11/129,635, filed concurrently herewith, assigned to the assignee hereof, and expressly incorporated in its entirety by reference herein.

BACKGROUND

I. Field

The present invention relates generally to delivery of streaming data over a wireless communication system, and more specifically, to transmission of multimedia data over a wireless communication system.

II. Background

Demand for the delivery of multimedia data over various communication networks is increasing. For example, consumers desire the delivery of streaming video over various communication channels, such as the Internet, wire-line and radio networks. Multimedia data can be different formats and data rates, and the various communication networks use different mechanisms for transmission of real time data over their respective communication channels.

One type of communication network that has become commonplace is mobile radio networks for wireless communications. Wireless communication systems have many applications including, for example, cellular telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including frequency division multiple access (FDMA), time division multiple access (TDMA), and code division multiple access (CDMA).

Different domestic and international standards have been established to support the various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), and emerging high-data-rate systems such as cdma 2000, Universal Mobile Telecommunications Service (UMTS), wideband CDMA (WCDMA), and others. These standards are promulgated by the Telecommunication Industry Association (TIA), 3rd Generation partnership Project (3GPP), European Telecommunication Standards Institute (ETSI), and other well-known standards bodies.

Users, or customers, of mobile radio networks, such as cellular telephone networks, would like to receive streaming media such as video, multimedia, and Internet Protocol (IP) over a wireless communication link. For example, customers desire to be able to receive streaming video, such as a teleconference or television broadcasts, on their cell phone or other portable wireless communication device. Other examples of the type of data that customers desire to receive with their wireless communication device include multimedia multicast/broadcast and Internet access.

A protocol that provides a mechanism to stream real time data over an IP network is the real-time transport protocol (RTP). RTP is a flexible protocol for transmitting real time data, such as audio and video over an IP network. It is desirable to use RTP to stream real-time data to wireless communication devices.

Typically, in RTP, streaming data is encoded into data packets. The RTP data packets include routing and sequencing information appended to each packet. The appended routing and sequencing information is commonly referred to as a header. Due to the limited resources available in a wireless communication system, such as limited bandwidth, it is desirable to reduce the amount of data that is transmitted.

Thus, there is therefore a need in the art for techniques and apparatus that can reduce the amount of data that is transmitted in a wireless communication system during the transmission of streaming data, such as multimedia data and VoIP.

SUMMARY

Embodiments disclosed herein address the above stated needs to reduce the amount of data required to transmit multimedia data streams over a wireless communication channel. Techniques for reducing, or eliminating, headers in the transmission of real time transport protocol (RTP) data streams over a wireless communication system are described. These techniques include determining a physical layer packet size of the wireless communication system and determining a maximum size of a compressed header and then, partitioning an information unit, wherein the size of the partitions are selected such that after a partition is encoded, the aggregate size of the encoded partition and the compressed header are no greater than the physical layer packet size.

Another technique for transmitting multimedia data over a wireless communication system includes negotiating a physical layer compressed header size between participants in a communication session.

Additional aspects include using robust header compression or zero byte header compression techniques with multimedia data transmitted over a wireless communication channel.

The above techniques can be used for various types of multimedia data. For example, the techniques can be used with variable bit rate data streams, video streams, or video teleconference streams.

The above techniques can also be used with various over the air interfaces. For example, the techniques can be used with Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), cdma2000, Wideband CDMA (WCDMA), and others.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The word "streaming" is used herein to mean real time delivery of multimedia data of continuous in nature, such as, audio, speech or video information, over dedicated and shared channels in conversational, unicast and broadcast applications. The phrase "multimedia frame", for video, is used herein to mean video frame that can be displayed/rendered on a display device, after decoding. A video frame can be further divided in to independently decodable units. In video parlance, these are called "slices". In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

An aspect of the invention is to reduce the amount of data that is transmitted in a wireless communication system when a data stream is transmitted. Examples of streaming of data include multimedia data, such as, video, teleconference, broadcast/multicast services, internet protocol (IP), and voice over IP (VoIP).

The techniques described herein relate to partitioning information units, thereby creating a plurality of data packets. Techniques described make use of some of the aspects described in co-pending U.S. patent applications referenced in the REFERENCE TO CO-PENDING APPLICATIONS FOR PATENT section above. For example, a technique referred to as explicit bit rate (EBR) is described wherein an encoder may be constrained such that it encodes application layer information units into sizes that match physical layer packet sizes of a communication channel.

As noted, RTP is a mechanism used to stream data by encoding the stream into packets. In RTP, a header that includes routing and sequencing information is appended to each packet. An aspect of the present invention is to reduce the size of the header, or remove the header entirely. In this way, the amount of data transmitted over a wireless communication channel transmitting RTP packets is reduced.

Figure 1:
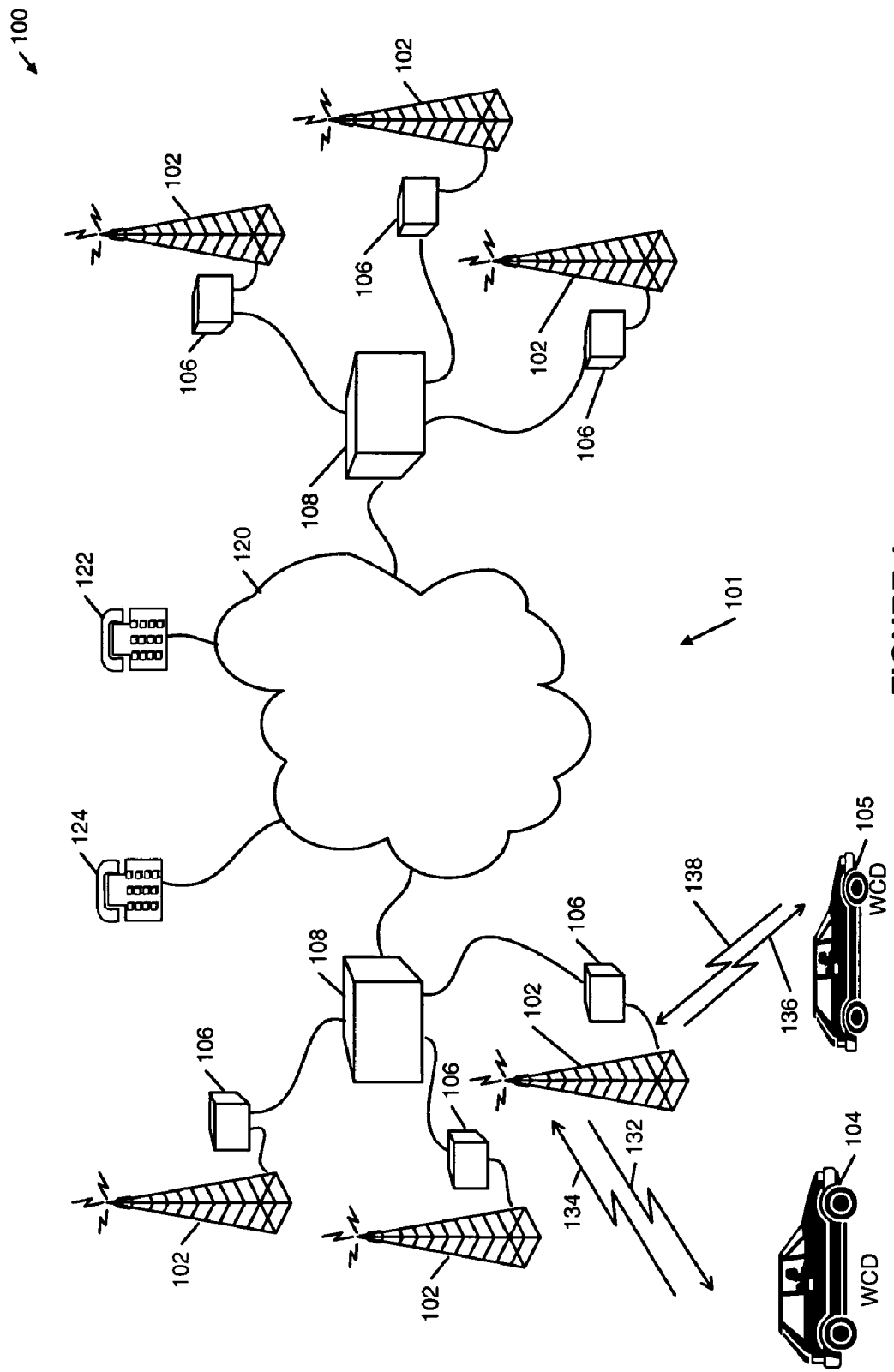
FIG. 1 shows a communication system 100 constructed in accordance with the present invention.

FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations (MS) or mobiles. In general, WCDs may be either mobile or fixed. The landline communication devices 122 and 124 can include, for example, serving nodes, or content servers, that provide various types of multimedia data such as streaming data. In addition, MSs can transmit streaming data, such as multimedia data.

The infrastructure 101 may also include other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, IP networks, or the public switched telephone network (PSTN).

The term "forward link" or "downlink" refers to the signal path from the infrastructure 101 to a MS, and the term "reverse link" or "uplink" refers to the signal path from a MS to the infrastructure. As shown in FIG. 1, MSs 104 and 105 receive signals 132 and 136 on the forward link and transmit signals 134 and 138 on the reverse link. In general, signals transmitted from a MS 104 and 105 are intended for reception at another communication device, such as another remote unit, or a landline communication device 122 and 124, and are routed through the IP network or switching network 120. For example, if the signal 134 transmitted from an initiating WCD 104 is intended to be received by a destination MS 105, the signal is routed through the infrastructure 101 and a signal 136 is transmitted on the forward link to the destination MS 105. Likewise, signals initiated in the infrastructure 101 may be broadcast to a MS 105. For example, a content provider may send multimedia data, such as streaming multimedia data, to a MS 105. Typically, a communication device, such as a MS or a landline communication device, may be both an initiator of and a destination for the signals.

Examples of a MS 104 include cellular telephones, wireless communication enabled personal computers, and personal digital assistants (PDA), and other wireless devices. The communication system 100 may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), IS2000, HRPD, cdma2000, Wideband CDMA (WCDMA), and others.

Figure 2:
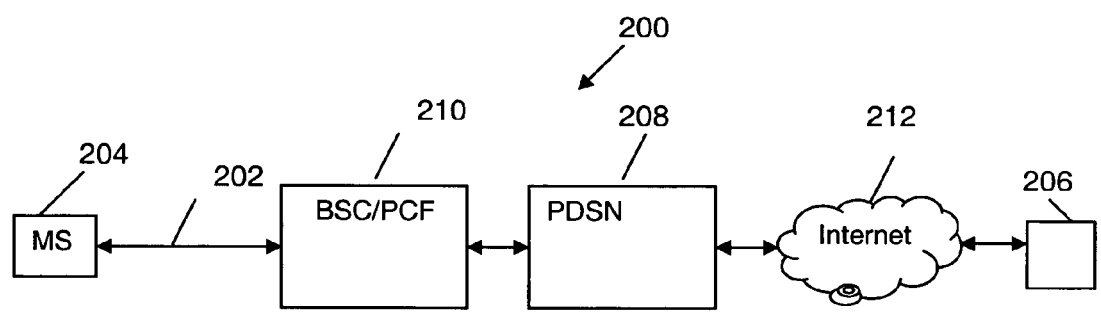
FIG. 2 is a block diagram illustrating an exemplary packet data network and various air interface options for delivering packet data over a wireless network.

FIG. 2 is a block diagram illustrating an exemplary packet data network and various air interface options for delivering packet data over a wireless network. The techniques described may be implemented in a packet switched data network 200 such as the one illustrated in FIG. 2. As shown in the example of FIG. 2, the packet switched data network system may include a wireless channel 202, a plurality of recipient nodes or MS 204, a sending node or content server 206, a serving node 208, and a controller 210. The sending node 206 may be coupled to the serving node 208 via a network 212 such as the Internet.

The serving node 208 may comprise, for example, a packet data serving node (PDSN) or a Serving GPRS Support Node (SGSN) or a Gateway GPRS Support Node (GGSN). The serving node 208 may receive packet data from the sending node 206, and serve the packets of information to the controller 210. The controller 210 may comprise, for example, a Base Station Controller/Packet Control Function (BSC/PCF) or Radio Network Controller (RNC). In one embodiment, the controller 210 communicates with the serving node 208 over a Radio Access Network (RAN). The controller 210 communicates with the serving node 208 and transmits the packets of information over the wireless channel 202 to at least one of the recipient nodes 204, such as an MS.

In one embodiment, the serving node 208 or the sending node 206, or both, may also include an encoder for encoding a data stream, or a decoder for decoding a data stream, or both. For example the encoder could encode a video stream and thereby produce variable-sized frames of data, and the decoder could receive variable sized frames of data and decode them. Because the frames are of various size, but the video frame rate is constant, a variable bit rate stream of data is produced. Likewise, a MS may include an encoder for encoding a data stream, or a decoder for decoding a received data stream, or both. The term "codec" is used to describe the combination of an encoder and a decoder.

In one example illustrated in FIG. 2, data, such as multimedia data, from the sending node 206 which is connected to the network, or Internet 212 can be sent to a recipient node, or MS 204, via the serving node, or Packet Data Serving Node (PDSN) 206, and a Controller, or Base Station Controller/Packet Control Function (BSC/PCF) 208. The wireless channel 202 interface between the MS 204 and the BSC/PCF 210 is an air interface and, typically, can use many channels for signaling and bearer, or payload, data.

Air Interface

The air interface 202 may operate in accordance with any of a number of wireless standards. For example, the standards may include standards based on TDMA or FDMA, such as Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

RTP Packetization

The Real-Time Transport Protocol (RTP) is a protocol developed for transmitting real time data, such as multimedia data. RTP is a flexible protocol providing mechanisms to stream real time data over IP networks. See "RTP: A Transport Protocol for Real-Time Applications", H. Schulzrinne [Columbia University], S. Casner [Packet Design], R. Frederick [Blue Coat Systems Inc.], V. Jacobson [Packet Design], RFC-3550 draft standard, Internet Engineering Steering Group, July 2003, available at URL www.faqs.org/rfc/rfc3550.html). Streaming refers to a technique for transferring data such that it can be processed as a steady and continuous stream.

A description of a way to use RTP to stream a particular type of data, for example video, is referred to as an RTP profile. In an RTP profile, the output of a source encoder is grouped into packets and header information is added to the packet.

Figure 3:
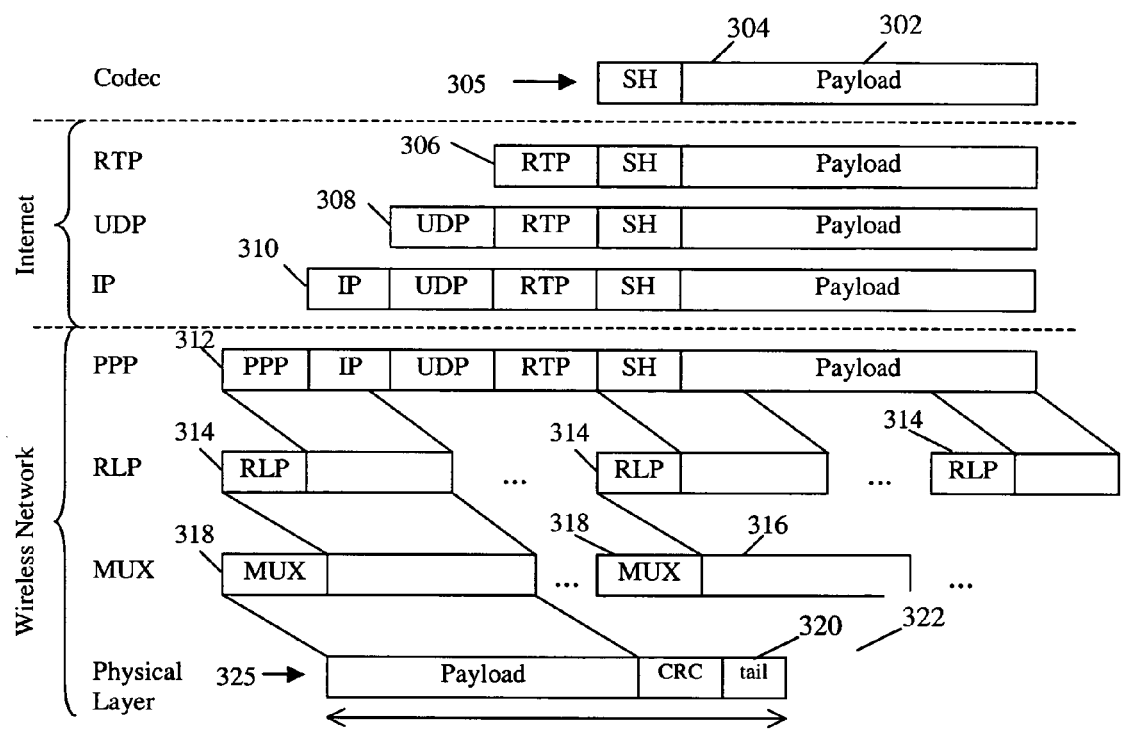
FIG. 3 is a diagram illustrating various levels of encapsulation present when using RTP to transmit multimedia data over a wireless link.

FIG. 3 is a diagram illustrating various levels of encapsulation present when using RTP to transmit multimedia data, such as video data or VoIP, over a wireless link. As shown in FIG. 3, a payload 302 is generated. For example, the payload can be streaming multimedia data, for example, video data or VoIP. The payload 302 may be pre-pended by a Slice_Header (SH) 304 that includes additional information pertaining to the payload 302. The RTP protocol then encapsulates the payload into one or several RTP packets and appends an RTP header 306. In the example illustrated in FIG. 3, the payload is encapsulated into a single RTP packet with an RTP header 306 indicated by "RTP." A User Datagram Protocol (UDP) header 308 is then added to each RTP packet, indicating the source and destination ports. An Internet Protocol (IP) header 310 is then added to indicate the network address of the source and destination hosts. For example, in one embodiment the RTP header may be 12 bytes, the UDP header may be 20 bytes, and the IP header may be 8 bytes, thereby resulting in a 40 byte header being appended to the payload 302. It is desirable to reduce the size of the header to conserve system resources when transmitting RTP over a wireless communication system.

Upon entering the wireless network, a point to point protocol (PPP) header 312 is added to provide framing information for serializing the packets into a continuous stream of bits. A radio link protocol, for example, RLP in cdma2000 or RLC in W-CDMA, then packs the stream of bits into RLP packets 314. The radio-link protocol allows, among other things, the re-transmission and re-ordering of packets sent over the air interface. Finally, the air interface MAC-layer takes one or more RLP packets 314, packs them into MUX layer packet 316, and adds a multiplexing header (MUX) 318. A physical layer packet channel coder then adds a checksum (CRC) 320 to detect decoding errors, and a tail part 322 forming a physical layer packet 325.

The Internet Engineering Steering Group has proposed guidelines, or rules, about the packetization of video that is carried by RTP. See, "RTP Payload Format for MPEG-4 Audio/Visual Streams", Y. Kikuchi [Toshiba], T. Nomura [NEC], S. Fukunaga [Oki], Y. Matsui [Matsushita], H. Kimata [NTT], RFC-3016 proposed standard, Internet Engineering Steering Group, November 2000, available at URL www.faqs.org/rfcs/rfcs3060.html). Although these rules address MPEG-4, similar schemes also apply to the other video codecs. The RFC3016 defines the following three options for packetization, where Video Object Planes (VOP) refers to an MPEG-4 video frame:

1. Packing one Video Frame per RTP Packet: "The RTP timestamp indicates the sampling instance of the VOP contained in the RTP packet. A constant offset, which is random, is added for security reasons." In this case, the RTP timestamp and RTP sequence number are incremented.
2. Packing multiple Video Frames per RTP Packet: "When multiple VOPs are carried in the same RTP packet, the timestamp indicates the earliest of the VOP times within the VOPs carried in the RTP packet. Timestamp information of the rest of the VOPs are derived from the timestamp fields in the VOP header (modulo_time_base and vop_time_increment). [ . . . ] This kind of packetization is effective to save the overhead of RTP/IP headers when the bit-rate of the underlying network is low. However, it will decrease the packet-loss resiliency because multiple video packets are discarded by a single RTP packet loss. The optimal number of video packets in an RTP packet and the length of the RTP packet can be determined considering the packet-loss rate and the bit-rate of the underlying network." In this case, the RTP timestamp jumps ahead and the RTP sequence number is incremented.
3. Segmenting one Video Frame over multiple RTP Packets: "It is RECOMMENDED that a single video packet is sent as a single RTP packet. The size of a video packet SHOULD be adjusted in such a way that the resulting RTP packet is not larger than the path-MTU. [ . . . ] When the packet-loss rate of the underlying network is high, this kind of packetization is recommended. Even when the RTP packet containing the VOP header is discarded by a packet loss, the other RTP packets can be decoded by using the HEC (Header Extension Code) information in the video packet header. No extra RTP header field is necessary." In this case, the RTP timestamp remains the same and the RTP sequence number is incremented.

In general, RTP packetization is simpler for speech codecs, or vocoders, as the "variability" of encoders is well defined. For example in cdma2000 vocoders, the payload size is one of four (4) possible rates (i.e., full rate, half rate, fourth rate, and eighth rate).

Header Compression During Transmission of Multimedia Data Streams

Generic Header Compression Support

A size of a compressed header, wherein the header includes RTP/UDP/IP/PPP headers, for a given compression scheme, depends on changes in the RTP timestamp and the RTP sequence number, among other things. An encoder does not know the actual size of the compressed header at the time of encoding a data packet, for example from a multimedia data stream such as a video data stream. While the actual size of the compressed header may not be known, it is possible to set an upper limit on the header size. For example, during setup of a session an upper limit on header size may be established depending on parameters such as the compression scheme, UDP checksum option, and the like.

In one embodiment, a set of possible data rates may be negotiated between a sending terminal, a receiving terminal and their corresponding PDSNs. For example, a set of possible data rates may be negotiated between a sending MS, a receiving MS, and their corresponding PDSNs. Each of the possible data rates has associated with it physical layer packet sizes as described in co-pending U.S. application Ser. No. 11/129,625 entitled "DELIVERY OF INFORMATION OVER A COMMUNICATION CHANNEL", supra. Let S represent, in bytes, the set of physical layer packet sizes corresponding to the data rates available to the encoder after negotiation.

$$S = [r_1\ r_2\ \ldots\ r_i]'\qquad\text{Eq. 1}$$

Then, $$\hat{S} = S - x\qquad\text{Eq. 2}$$

where $\hat{S}$ represents the maximum amount of data, in bytes, within a physical layer packet that can be used for payload, and $x \in \{0, 1, 2, 3, 4\}$ where the value of x represents an upper limit on the compressed header size, in bytes, and is dependent on the type of header compression scheme used. For example, as discussed further below, values of correspond to different compression schemes, where:

$x=0$ corresponds to zero-header compression, where the header is removed entirely;

$x=1$ or 2 correspond to robust header compression (ROHC) without UDP checksum;

$x=3$ or 4 correspond to ROHC with UDP checksum;

In one embodiment, MSs, content servers and PDSNs that are involved in a session negotiate values for S and x during setup of a session setup. The negotiation may take into account parameters, such as, the encoding schemes and compression schemes supported by the various devices in the session. During the session a data stream, such as a multimedia data stream, may be partitioned into portions that are sized such that an encoder generates packets that are S−x bytes in size, leaving enough space for compressed headers. For example, if a video data stream is transmitted during a session, a video frame is partitioned, or "sliced", such that when the video slice is encoded the encoded slice will be S−x bytes and the compressed header will be no larger than x bytes in size. If the size of the compressed header is less than x bytes, then null bytes can be included, or the amount of data allocated to encoding the video slice can be increased so that data packets that are generated are of a desired size.

Figure 4:
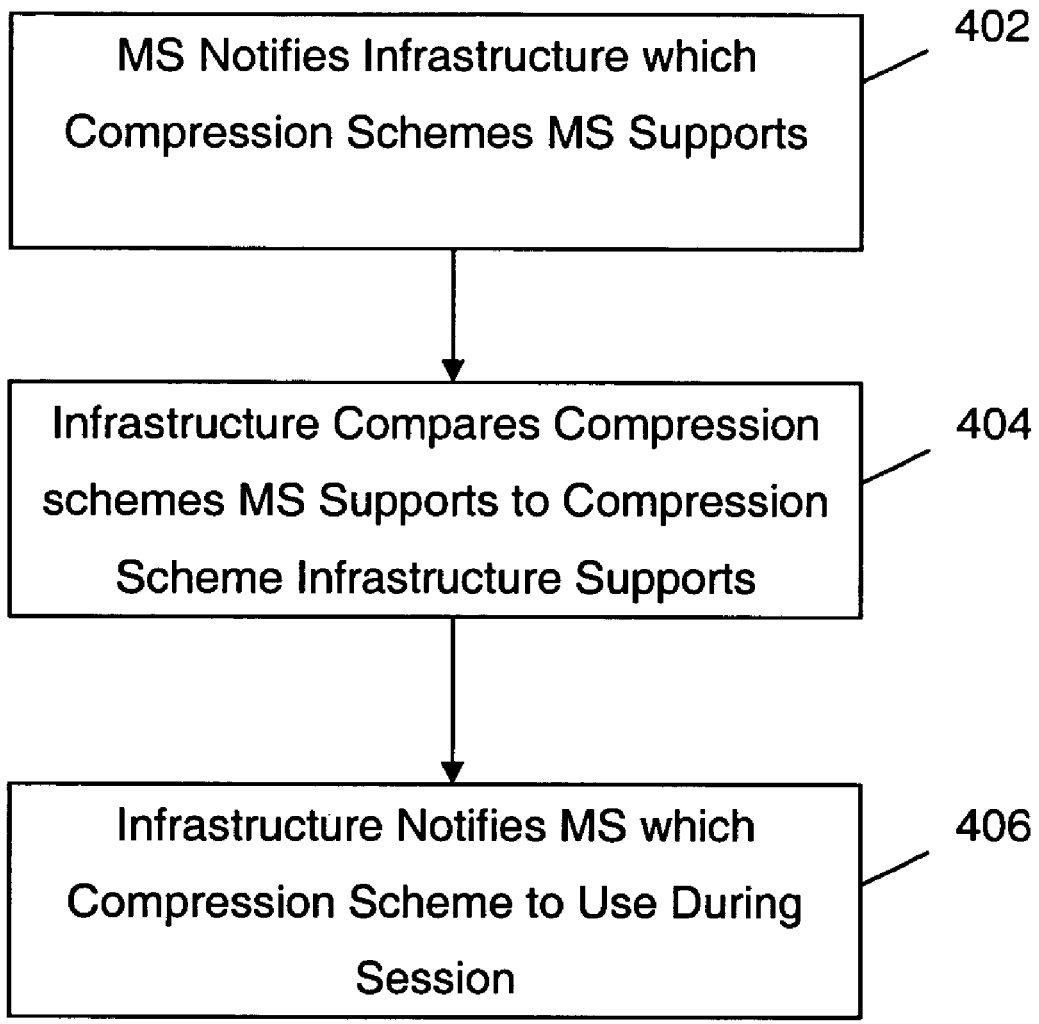
FIG. 4 is a flow diagram illustrating an example of a negotiation of values for data packet and compressed header sizes.

FIG. 4 is a flow diagram illustrating an example of a negotiation of values for S and x. Flow begins in block 402 where a MS notifies a device in the infrastructure, for example a PDSN, which compression schemes the MS supports. In addition, the MS can notify the PDSN if the MS prefers one of the supported compression schemes over another. Flow then continues to block 404. In block 404, the infrastructure device, such as a PSDN, compares the MS supported compression schemes with the compression schemes supported by the infrastructure device. The infrastructure device may also take into account any preferences of the MS. Flow then continues to block 406 where the infrastructure device notifies the MS of the compression scheme to use during a session.

As an example of the negotiation illustrated in FIG. 4, a MS may notify a PDSN that the MS supports x=0, 3, and 1 in that preferred order. In this example, the PDSN does not support x=1 (ROHC without UDP checksum). The PDSN may then send the supported options (x=0, 3) to a second PDSN that will be participating in the session. The second PDSN may find out that a receiving MS that will also be participating in the session can support x=0, 1, 2, 3, and 4, while the second PDSN itself can support x=0, 1, and 4. Because the only value of x that is supported by all participants in the session is x=0, the session will be established using a value of zero for x.

Figure 5:
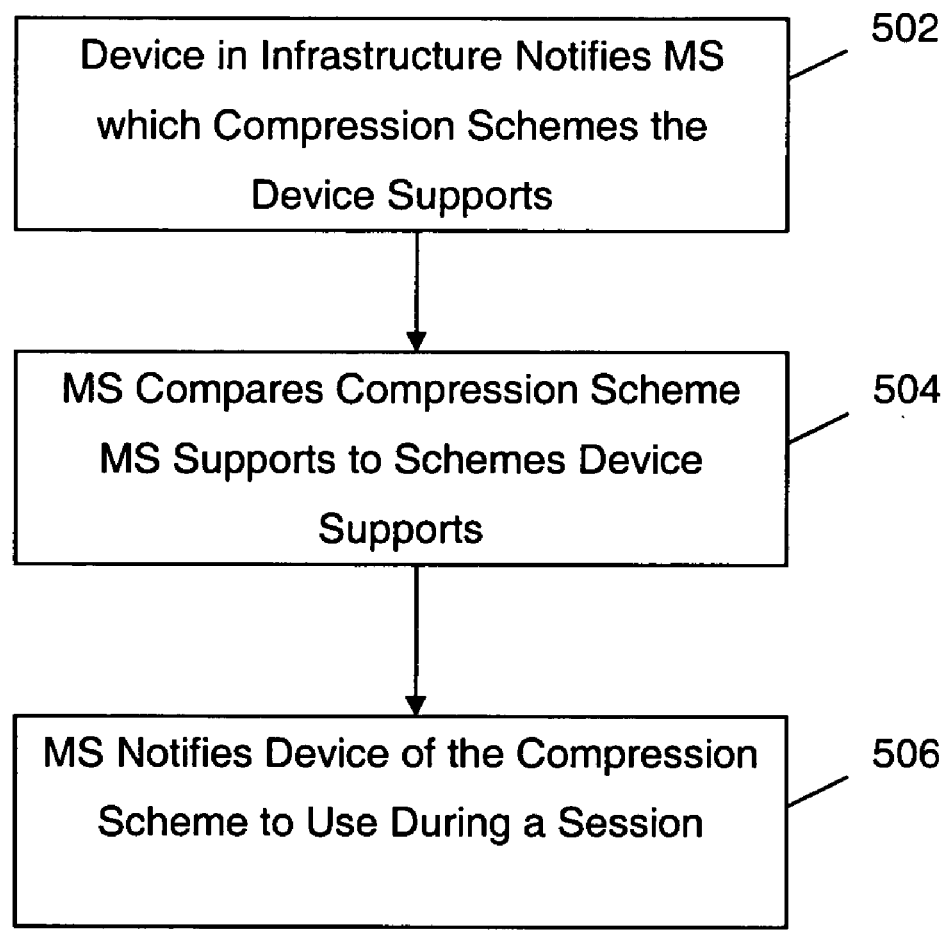
FIG. 5 is a flow diagram illustrating another example of a negotiation of values for data packet and compressed header sizes.

FIG. 5 is a flow diagram illustrating another example of a negotiation of values for S and x. Flow begins in block 502 where a device in the infrastructure, for example a PDSN, notifies a MS as to which compression schemes the infrastructure device supports. In addition, the infrastructure device can notify the MS of any preferences the infrastructure has for one of the supported compression schemes over another. Flow then continues to block 504. In block 504, the MS compares the MS supported compression schemes with the compression schemes supported by the infrastructure device. The MS may also take into account any preferences of the infrastructure device. Flow then continues to block 506 where the MS notifies the infrastructure device of the compression scheme to use during a session.

An example of a protocol sequence for the above examples is listed below:

During PPP Internet Protocol Control Protocol (IPCP), both mobile and PDSN indicate their header compression capabilities to each other, along with any preferences, and negotiate to a set of common compression capabilities supported by both mobile and PDSN.

The mobile determines which header compression type to be used and hence the x value.

The mobile conveys information, such as the x value, the data packet size, such as a video slice size, etc., to a content server in communication with a PSDN via a wireless communication system (e.g., Session Description Protocol (SDP) parameters in Session Initiation Protocol (SIP) or Real Time Streaming Protocol (RTSP), etc.).

The mobile conveys flow information, such as, address/port, header compression type, etc., to the PDSN via 3GPP2-specific signaling (i.e., RESerVation (RESV) message). This information allows the PDSN to know what header compression type to be used on this particular session flow identified by the address/port.

Robust Header Compression

Robust Header Compression (ROHC) as used herein relates to compression schemes that make use of redundancies between consecutive packets by maintaining state information (context) at both a compressor and a decompressor. The static context information is sent only initially, at the beginning of a session, while dynamic context is sent with subsequent data packets. In order for the decompressor to regenerate the uncompressed packets correctly, the context in the decompressor needs to be synchronized to the context used by the compressor during compression. Techniques that have been developed to maintain synchronization of the context between the decompressor and compressor include the Robust Header Compression (ROHC) technique developed by the ROHC Working Group of the Internet Engineering Task Force, [see, for example the standards and drafts at the Internet URL www.ietf.org/rfc/rfc3095.txt?number=3095], incorporated by reference herein in its entirety.

Using ROHC there is a one byte header for most payloads when context is available at the decompressor and a forty-four byte header when it is necessary to establish the context at the decompressor. When UDP checksum is enabled, the compressed header size, when context is available at the decompressor, is three bytes. In one embodiment, ROHC is used and when context is available at the decompressor the payload packet sizes are restricted to be one byte smaller than the physical layer packet sizes. In another embodiment, ROHC with UDP checksum enabled is used and when context is available at the decompressor the payload packet sizes are restricted to be three bytes smaller than the physical layer packet sizes.

When ROHC context needs to be established, a "blank and burst" transmission feature of cdma2000 can be used, for example on multiple communication channels, or an additional packet can be sent. In this way, use of ROHC can be used with the techniques described and thereby result in a reduction in the amount of data transmitted. "Blank and burst" means that the signaling data (in this case the ROHC context information) is sent instead of voice data.

Zero Byte Header Compression

A third generation mobile technology, known as Universal Mobile Telecommunications System (UMTS), can deliver audio and video to wireless devices anywhere in the world through fixed, wireless and satellite systems. In general, a UMTS codec payload size is fixed based on the Adaptive Multi-Rate (AMR) mode. In order to amortize the RTP overhead across multiple frames one or both of the following methods can be used:

1. header compression (such as ROHC)
2. bundling multiple frames in one RTP packet When bundling is used, the RTP timestamp is that of the earliest frame in the RTP packet.

When an IP node is communicating with a receiver, or "sink" terminal, it may not be necessary to reconstruct the RTP header if the timestamp information is implicitly known. If the decoder receives frames at a constant, known, rate, the decoder may be able to output samples without additional timestamp information. For example, if a decoder receives at least one frame every 20 ms, the decoder can output samples every 20 ms without additional timestamp information. Blank frames may be generated during packet losses.

Figure 6:
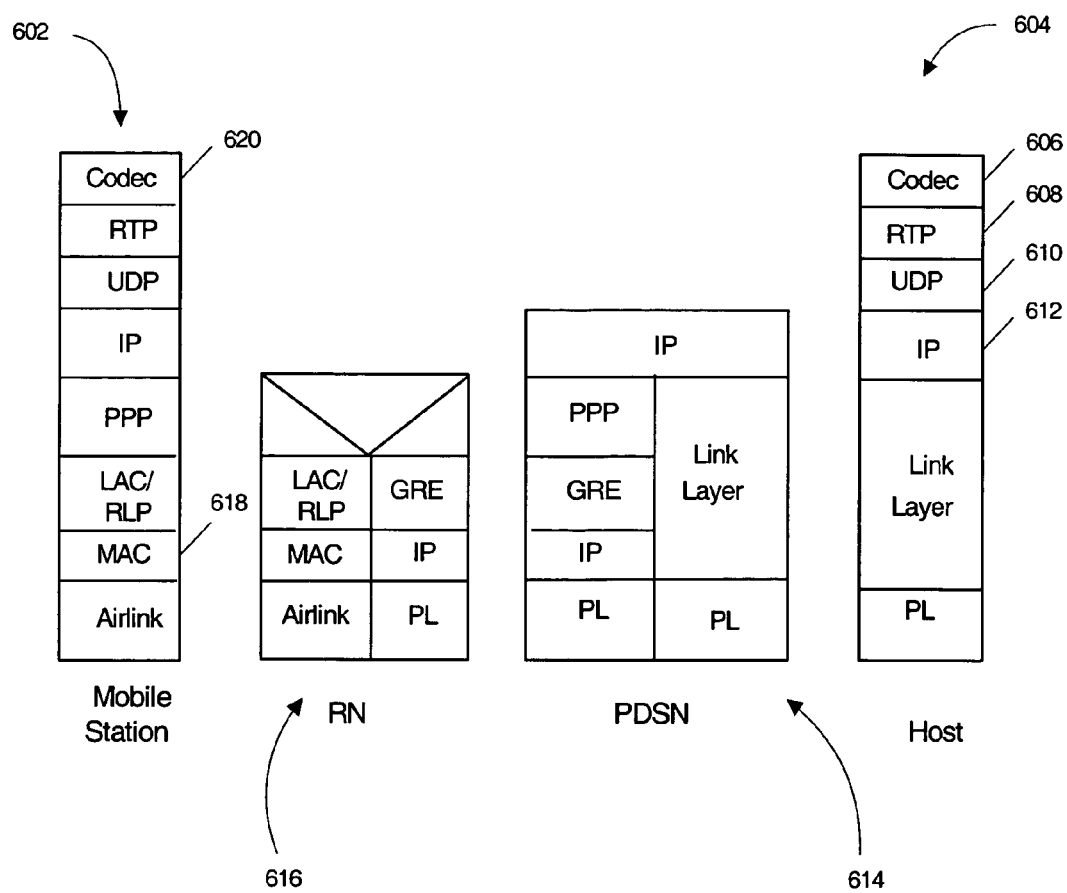
FIG. 6 is a diagram illustrating protocol stack for packet data in accordance with a zero byte header compression technique in a wireless communication system.

FIG. 6 is a diagram illustrating a protocol stack for packet data in accordance with a zero byte header compression technique in a wireless communication system. In the example illustrated in FIG. 6, a MS 602 receives data from a host 604 in the infrastructure. In the host 604 a codec 606 encodes data packets. The output of the codec has RTP, UDP and IP header information, 608, 610, and 612 respectively, appended to the data packets. A PDSN 614 sends the encoded data packet to the MS 602 via a Radio Network 616, such as a base station/packet control function. When the data packets are received by the MS 602, the data packets are routed from a media access control layer 618 to a codec 620. The codec 620 in the MS 602 decodes the received packet.

As described above, with RTP packetization it has been shown that when multiple video frames are included in one RTP packet a compliant decoder can recreate the timing of frames in this packet using the modulo_timebase and time_incriment fields of the subsequent video frames in the RTP packet. For example, using EBR, if there is a QoS guarantee that n video frames are delivered every nT ms (where T is the time between two video frames, T=1000/frames_per_second), a mechanism for synchronous delivery of video data may be established. Thus, the EBR approach can utilize zero byte header compression, similarly to Service Option 60 (SO60) for speech. Use of zero byte header compression can greatly reduce the amount of data that is transmitted. For example, in a wireless communication system based on CDMA, for a supplemental channel (SCH) operating at 8× (a 64 kbps stream) this technique could result in a reduction of at least 44 bytes of header information for each 160 bytes, e.g. about a 27.5% savings in the bitrate.

Figure 7:
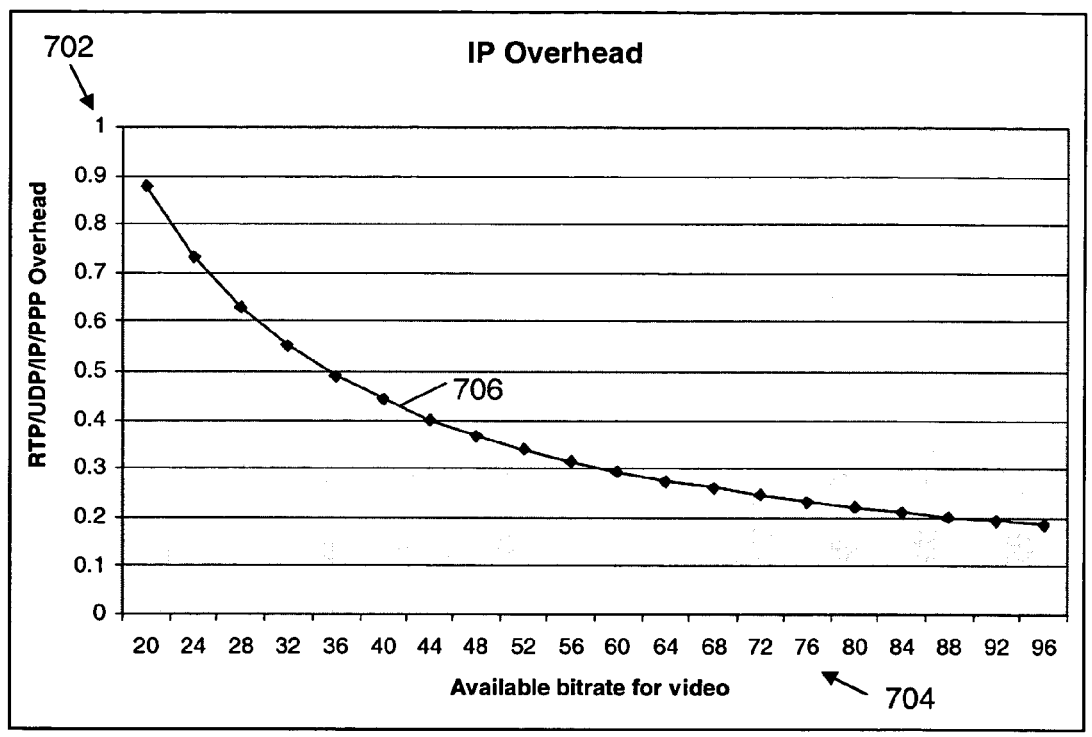
FIG. 7 is a chart illustrating IP header overhead verses data rate of a video data stream.

FIG. 7 is a chart illustrating IP header overhead verses data rate of a video data stream. The vertical axis 702 represents a RTP/UDP/IP/PPP overhead normalized as a percent of the total bitrate and the horizontal axis 704 represents a bitrate for the video stream. The curve 706 of FIG. 7 illustrates the increase in available bitrate for data as the size of the overhead reduces. In the example illustrated in FIG. 7, a value of four bytes was used for PPP overhead. A value of four for the PPP overhead probably underestimates actual values for the PPP overhead because, occasionally, escape codes are added so that some of the video data is not mistaken for a PPP header.

As illustrated in FIG. 7, although the percentage of the total bit rate that is dedicated to overhead decreases as the bitrate increases, a significant amount of the total bitrate may be dedicated to transmission of overhead. For example, at a bit rate of 88 bytes per second about 20% of the total bit rate is dedicated to the transmission of overhead. Removal, or reduction, of header information through techniques such as ROHC and zero byte header compression allows bitrate that would otherwise be dedicated to transmission of overhead to instead be used to improve video quality or increase the system capacity, or the like.

Figure 8:
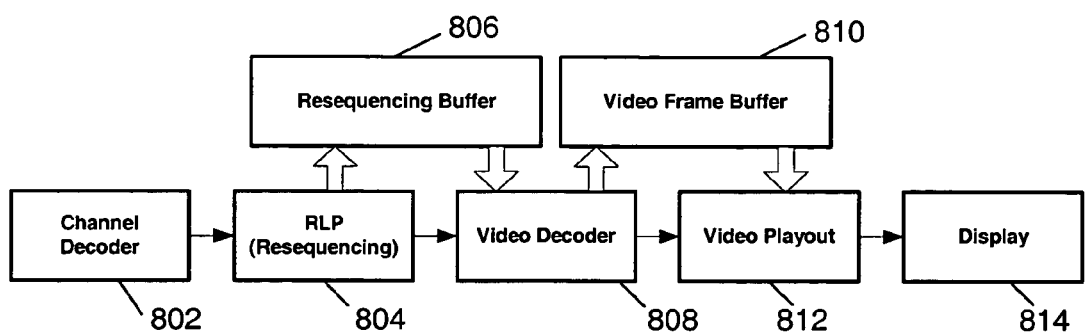
FIG. 8 is a block diagram illustrating exemplary components used in decoding multimedia data when a zero byte header technique is used.

FIG. 8 is a block diagram illustrating exemplary components used in decoding multimedia data when a zero byte header technique is used. As shown in FIG. 8, a channel decoder 802 is configured to receive data packets that make up a multimedia data stream. The output of the channel decoder 802 is connected to an RLP resequencer 804. The RLP resequencer 804 places the channel packets into a resequencing buffer 806 where the channel packets are sequenced in accordance with the sequence number of each packet. A multimedia decoder 808, for example a video decoder, retrieves the data packets from the resequencing buffer 806 and decodes the individual multimedia packets. The multimedia packets are output from the multimedia decoder 808 and placed into a multimedia frame buffer 810 where the multimedia packets are stored. A multimedia play out device 812 retrieves decoded multimedia packets from the multimedia frame buffer 810. The multimedia play out device 812 formats the multimedia packets for presentation to a user in an appropriate multimedia presentation device 814. For example, if the multimedia data is video data, then the multimedia presentation device 814 may be a video display.

Figure 9:
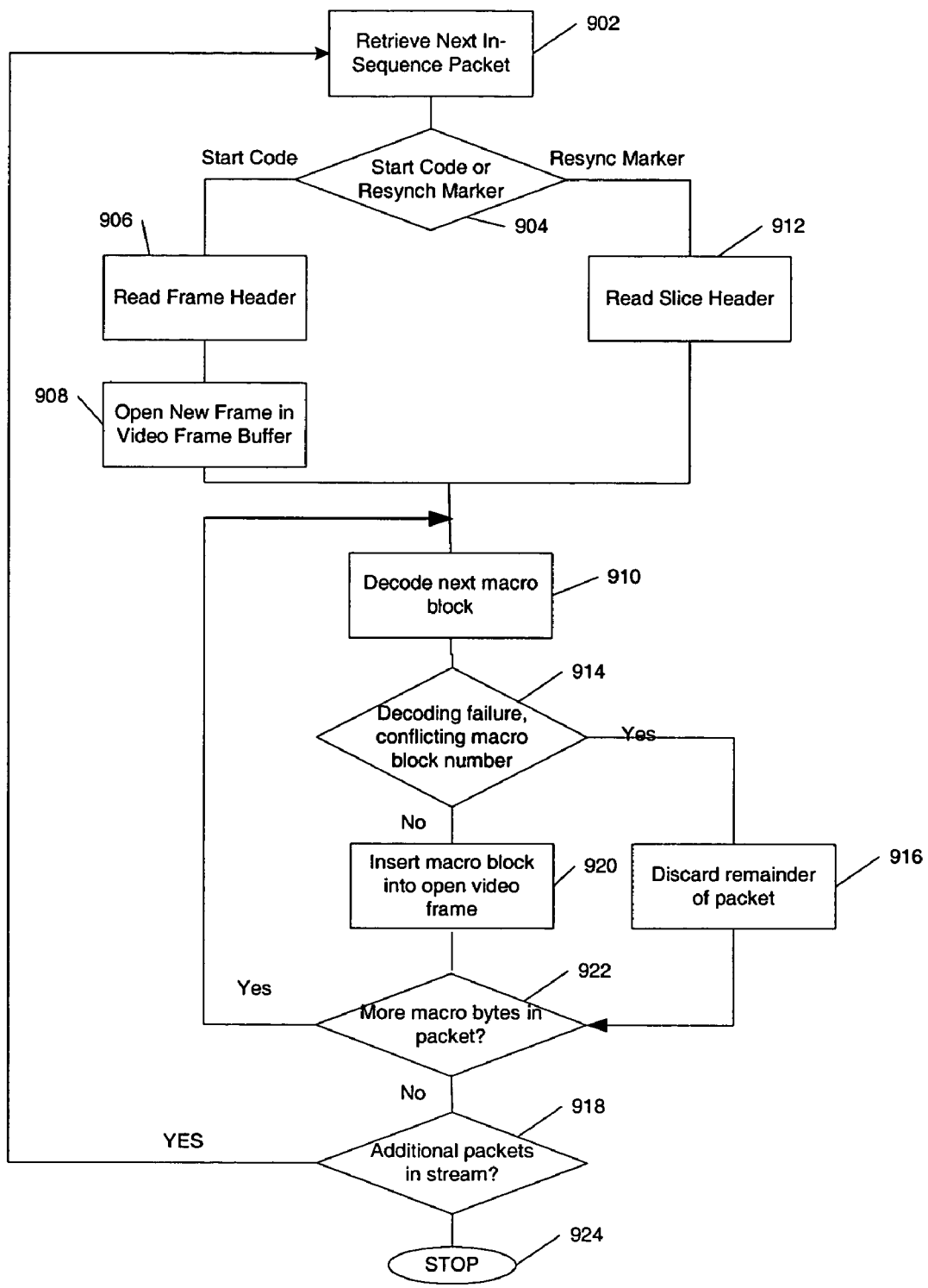
FIG. 9 is a flow chart illustrating an example of decoding of a multimedia data stream that uses a zero byte header compression technique.

FIG. 9 is a flow chart illustrating an example of decoding of a multimedia data stream that uses a zero byte header compression technique as could be accomplished in a multimedia decoder 808 shown in FIG. 8. In the example of FIG. 9, the multimedia data is video data and the multimedia decoder 808 is a video decoder. Flow begins in block 902 where the video decoder retrieves a data packet, or slice, that is next in-sequence from a resequencing buffer. Flow continues to block 904. In block 904 the data packet is examined and it is determined if the data packet includes a start code or a resync marker. If the data packet includes a start code, indicating the start of a video frame in the video stream, then flow continues to block 906. In block 906 the data packet is examined and a Frame Header is read. The frame header may include information about an entire video frame including timing information. Flow then continues to block 908 where a new frame in a video frame buffer is opened. Flow then continues to block 910.

Returning to block 904, if the data packet is examined and it is determined that the data packet, or slice, includes a resync marker flow continues to block 912. If the data packet includes a resync marker then the data packet is not the start of a video frame in the video stream but is a portion, also referred to as a slice or a macroblock, of a video frame. In block 912 a slice header of the data packet, or slice or macroblock, is read. Flow then continues to block 910.

In block 910 the data packet, or slice or macroblock, is decoded. Flow then continues to block 914 where it is determined if a decoding error occurred. For example, it may be determined in block 914 that there are conflicting sequence numbers in decoded data packets. If it is determined that there is a decoding error, an affirmative outcome at block 914, flow continues to block 916. In block 916 the data packet, or slice containing the decoding error is discarded. Flow then continues to block 918 where it is determined if there are additional data packets in the stream.

Returning to block 914, if there is no decoding error, a negative outcome at block 914, then flow continues to block 920. In block 920 the encoded packet, or slice, is inserted into the open video frame. Flow then continues to block 922 where it is determined if there are additional data packets in the stream.

In block 922 if it is determined if there are no additional data packets in the stream, a negative outcome at block 922, flow continues to block 918 where it is determined if there are additional data packets in the stream. At block 922, if it is determined that there are more packets in the stream, an affirmative outcome at block 922, then flow continues to block 910 and the next macro block of the packet is decoded. Returning to block 918, if it is determined there are additional data packets in the stream, an affirmative outcome at block 918, flow continues to block 902 and the next packet in the sequence is retrieved. If, in block 918, it is determined that there are no additional data packets in the stream, a negative outcome in block 918, flow continues to block 924 and flow stops.

Figure 10:
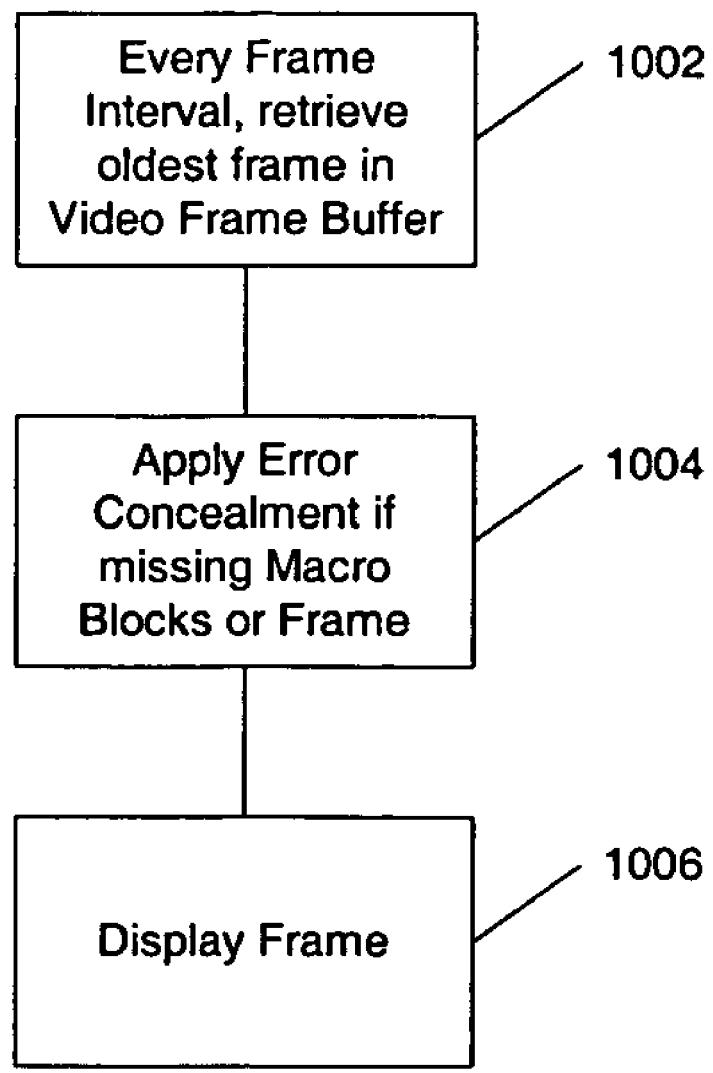
FIG. 10 is a flow diagram illustrating an exemplary procedure for a multimedia play out device.

FIG. 10 is a flow diagram illustrating an exemplary procedure for a multimedia play out device 812. In the example of FIG. 10, the multimedia data is video data and the multimedia play out device 812 is a video play out device. Flow begins in block 1002 where decoded video frames are retrieved from a video frame buffer at a frame rate of the video data. The video frame that is retrieved is the oldest frame in the video frame buffer. The age of the video frames may be determined, for example, by the RTP sequence number of the video frames, or timestamps of the video frames, or other techniques. Flow then continues to block 1004. In block 1004 the retrieved frames are examined and error concealment techniques are applied if desired. For example, error concealment techniques may be applied if there are missing packets, of slices, in a video frame, or if an entire video frame is missing, or other types of error.

Error concealment techniques can include, for example, copying packets, or slices from a previous video frame to replace a corrupted slice in the current video frame. Another example of error concealment is to use information from neighboring video slices to generate a replacement slice for a corrupted slice. For example, information from neighboring slices can be used to determine, for example, interpolation motion vectors for the corrupted slice. Other techniques for concealment of errors in video slices may also be implemented. The error concealment techniques of block 1004 can also be performed as part of the video decoding, for example as part of the flow diagram of FIG. 9.

Flow continues from block 1004 to block 1006. In block 1006 the video data is displayed. For example, the video data may be projected on a video display in a wireless communication device, such as a cell phone, PDA, wireless enabled personal computer, or other wireless communication device.

Figure 11:
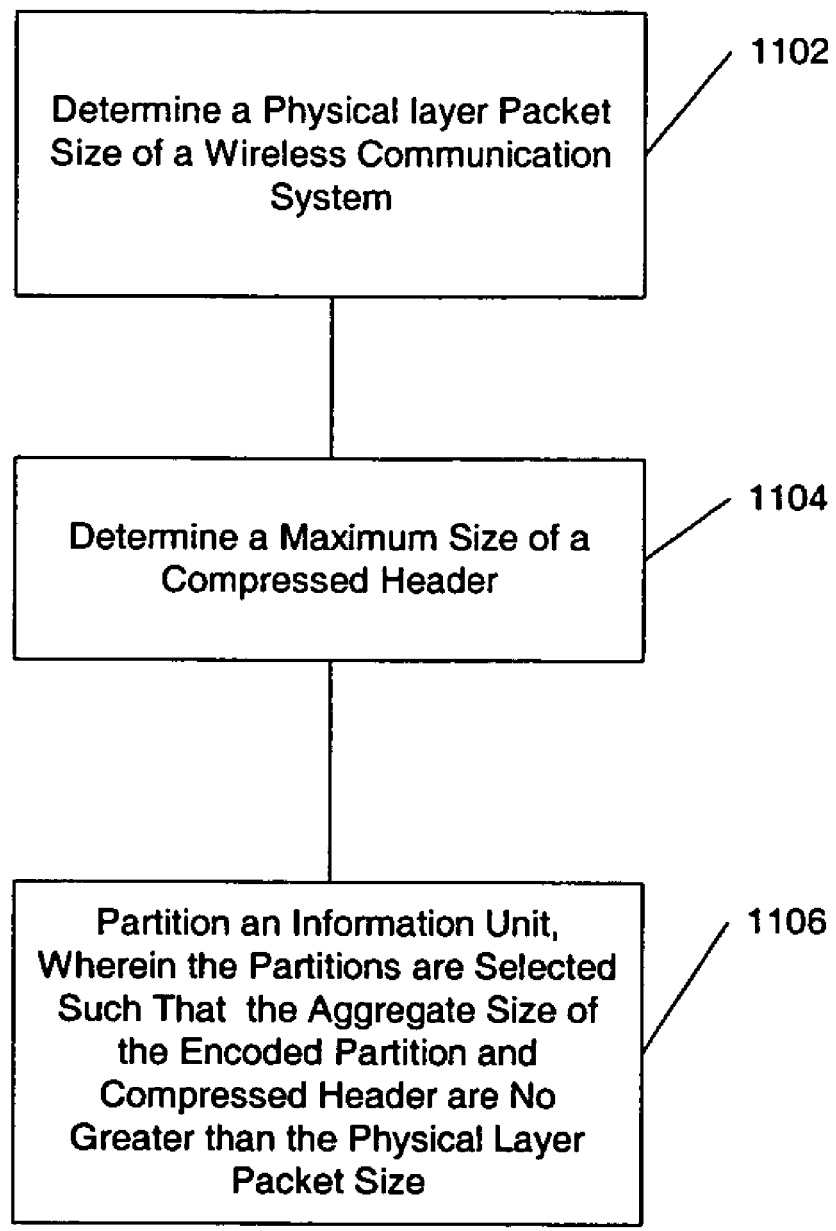
FIG. 11 is a flow diagram illustrating an exemplary procedure for transmitting data over a wireless communication system.

FIG. 11 is a flow diagram illustrating an exemplary procedure for transmitting data over a wireless communication system. Flow beginnings in block 1102 where a physical layer packet size of the wireless communication system is determined. For example, the physical layer packet size can be a single size or one of a plurality of sizes. Flow continues to block 1104 where a maximum size of a compressed header is determined. Flow then continues to Block 1106. In block 1106 an information unit is partitioned. The size of the partition is selected such that after a partition is encoded the total, or aggregate, size of the encoded partition and the compressed header are no greater than the physical layer packet size.

Figure 12:
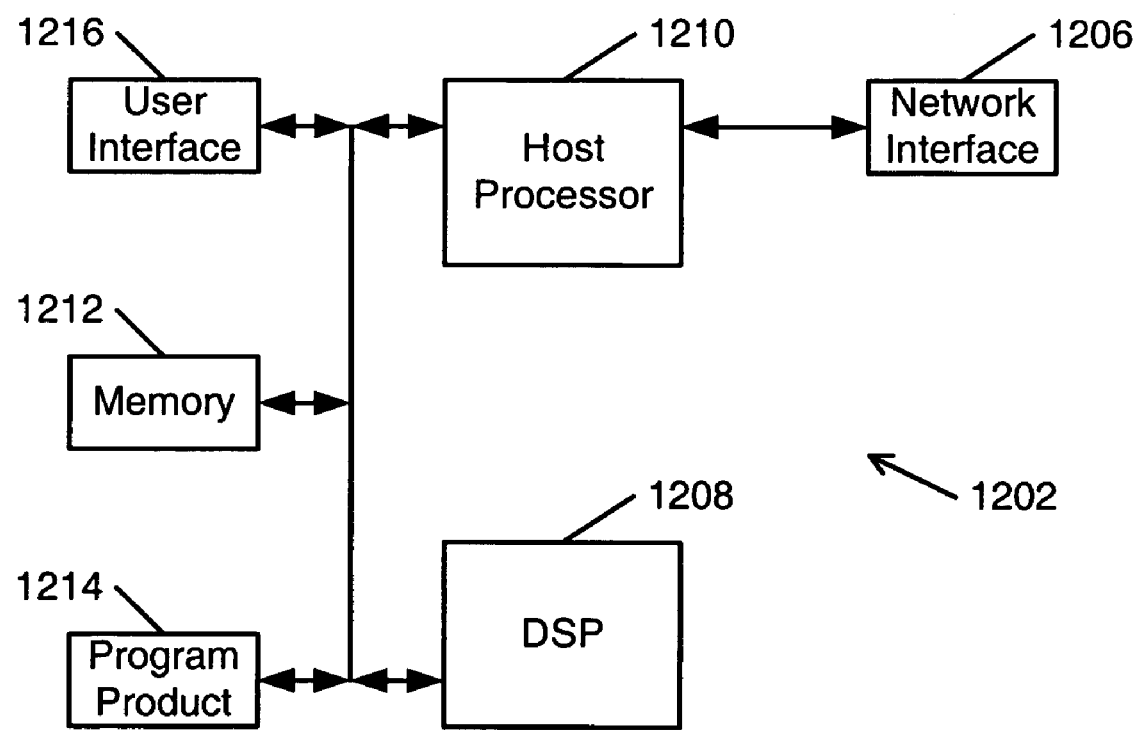
FIG. 12 is a block diagram of a wireless communication device, or mobile station (MS), constructed in accordance with an exemplary embodiment of the present invention.

FIG. 12 is a block diagram of a wireless communication device, or MS, constructed in accordance with an exemplary embodiment of the present invention. The communication device 1202 includes a network interface 1206, a codec 1208, a host processor 1210, a memory device 1212, a program product 1214, and a user interface 1216.

Signals from the infrastructure are received by the network interface 1106 and sent to the host processor 1210. The host processor 1210 receives the signals and, depending on the content of the signal, responds with appropriate actions. For example, the host processor 1210 may decode received data packets of a multimedia data stream, for example a video data stream, or it may route the received signal to the codec 1208 for decoding. In another embodiment, the received signal are sent directly to the codec 1208 from the network interface 1206.

Signals from the MS can also be transmitted to the infrastructure from the host processor 1206, or the codec 1208, or both via the network interface 1206. The host processor 1210 may partition a data stream into data packets that are sized so that after a header is appended to the data packet the total size of the data packet and appended header matches the size of a physical layer packet size. In another embodiment, the codec 1208 partitions a data stream into data packets that are sized so that after a header is appended to the data packet the total size of the data packet and appended header matches the size of a physical layer packet size. In both embodiments, the data packet and appended header are then sent to the network interface 1206 and transmitted to the infrastructure.

In one embodiment, the network interface 1206 may be a transceiver and an antenna to interface to the infrastructure over a wireless channel. In another embodiment, the network interface 1206 may be a network interface card used to interface to the infrastructure over landlines.

Both the host processor 1210 and the codec 1208 are connected to a memory device 1212. The memory device 1212 may be used to store data during operation of the MS. For example, the memory device may include a resequencing buffer, or a frame buffer, or both. The memory device may also store program code that will be executed by the host processor 1210 or the codec 1208, or both. For example, the host processor, codec, or both, may operate under the control of programming instructions that are temporarily stored in the memory device 1212. The host processor 1210 and codec 1208 also can include program storage memory of their own. When the programming instructions are executed, the host processor 1210 or codec 1208, or both, perform their functions, for example encoding and decoding multimedia streams with compressed headers. Thus, the programming steps implement the functionality of the respective host processor 1210 and codec 1208, so that the host processor and codec can each be made to perform the functions of encoding or decoding content streams with compressed headers as desired. The programming steps may be received from a program product reader 1214. The program product 1214 may store, and transfer the programming steps into the memory 1212 for execution by the host processor, codec, or both.

The program product 1214 may include a reader that receives interchangeable storage devices. The interchangeable storage devices may be a semiconductor memory chip, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 1214 may be a source file including the program steps that is received from the network and stored into memory and is then executed. In this way, the processing steps necessary for operation in accordance with the invention may be embodied on the program product. In FIG. 12, the exemplary storage medium is shown coupled to the host processor 1210 such that the host processor may read information from, and write information to, the storage medium. Alternatively, the storage medium may be integral to the host processor 1210.

The user interface 1216 is connected to both the host processor 1210 and the codec 1208. For example, the user interface 1216 may include a display and a speaker used to output multimedia data to the user.

Those of skill in the art will recognize that the step of a method described in connection with an embodiment may be interchanged without departing from the scope of the invention.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data over a wireless communication system, the method comprising:
   determining, using a prrocessor, a physical layer packet size of the wireless communication system from a set of physical layer packet sizes related to data encoding rates available;
   determining, using the processor, a maximum size of a compressed header based on supported compression schemes identified as usable within the wireless communication system; and
   partitioning an information unit based on the physical layer packet size and maximum size of the compressed header, wherein partitions are sized such that after a partition is encoded an aggregate size of each encoded partition and an associated compressed header is no greater than the physical layer packet size.

2. A method as defined in claim 1, wherein the information unit comprises multimedia data.

3. A method as defined in claim 1, wherein the information unit comprises video data.

4. A method as defined in claim 1, wherein the header is compressed in accordance rich robust header compression techniques.

5. A method as defined in claim 1, wherein the header is compressed in accordance with zero-byte header compression techniques.

6. A method as defined in claim 1, wherein determining the size of the physical layer packet and the n-maximum size of the compressed header is determined by negotiation between participants in a communication session.

7. A method as defined in claim 1, wherein the wireless communication system is a CDMA system.

8. A method as defined in claim 1, wherein the wireless communication system is a GSM system.

9. A method as defined in claim 1, wherein the wireless communication system is an EDGE system.

10. A method as defined in claim 1, wherein the wireless communication system is a GPRS system.

11. A method of transmitting multimedia data over a wireless communication system, the method comprising:
    determining, using a processor, a set of possible physical layer data packet sizes of available communication channels, each possible physical layer data packet size corresponding to an encoding rate;
    selecting a physical layer packet size corresponding to a related encoding rate from the set of possible physical layer data packet sizes;
    determining, using the processor, a maximum size of a compressed header based on supported compression schemes identified as usable within the wireless communication system;
    partitioning a frame of multimedia data into partitions based on the physical layer packet size and maximum size of the compressed header, wherein partition sizes are selected so that an aggregate size of a partition plus the maximum size of the compressed header match the physical layer packet size; and
    encoding the partition at the related encoding rate, appending the compressed header and transmitting the encoded partition with the appended header.

12. A method as defined in claim 11, wherein the multimedia data is a variable bit rate stream.

13. A method as defined in claim 11, wherein the multimedia data is a video stream.

14. A method as defined in claim 11, wherein determining the set of possible physical layer data packet sizes and the maximum size of the compressed header is determined by negotiation between participants in a communication session.

15. A method as defined in claim 11, wherein the communication channels are CDMA channels.

16. A method as defined in claim 11, wherein the communication channels are GSM channels.

17. A method as defined in claim 11, wherein the communication channels are EDGE channels.

18. A method as defined in claim 11, wherein the communication channels are GPRS channels.

19. A method as defined in claim 11, wherein the header is compressed in accordance with robust header compression techniques.

20. A method as defined in claim 11, wherein the header is compressed in accordance with zero byte header compression techniques.

21. A wireless communication device comprising:
    a processor configured to determine possible data packet sizes of available communication channels from a set of data packet sizes related to data encoding rates available and a maximum size of a compressed header based on supported compression schemes identified as usable by the wireless communication device;
    an encoder configured to partition multimedia data into partitions based on determined data packet size and maximum size of the compressed header, wherein partition sizes are selected so that an aggregate size of a partition plus maximum size of the compressed header match one possible data packet size, encode the partition at an encoding rate corresponding to the determined data packet size, and append the compressed header; and
    a transmitter configured to transmit the partition with the appended compressed header.

22. A wireless communication device as defined in claim 21, wherein the multimedia data is a data stream.

23. A wireless communication device as defined in claim 21, wherein the multimedia data is a video stream.

24. A wireless communication device as defined in claim 21, wherein the communication channels are CDMA channels.

25. A wireless communication device as defined in claim 21, wherein the communication channels are GSM channels.

26. A wireless communication device as defined in claim 21, wherein the communication channels are GPRS channels.

27. A wireless communication device as defined in claim 21, wherein the communication channels are EDGE channels.

28. A wireless communication device as defined in claim 21, wherein the header is compressed in accordance with robust header compression techniques.

29. A wireless communication device as defined in claim 21, wherein the header is compressed in accordance with zero byte header compression techniques.

30. A non-transitory computer readable medium comprising computer executable instructions which, when executed, perform a method of encoding data comprising:
determining a physical layer packet size of a wireless communication system from a set of physical layer packet sizes related to data encoding rates available;
determining a maximum size of a compressed header based on supported compression schemes identified as usable within the wireless communication system; and
partitioning an information unit based on the physical layer packet size and maximum size of the compressed header, wherein partition sizes are selected such that after a partition is encoded an aggregate size of the encoded partition and the compressed header is no greater than the physical layer packet size.

31. A non-transitory computer readable media embodying a method of transmitting multimedia data over a wireless communication system, the method comprising:
determining a set of possible physical layer data packet sizes of available communication channels, each possible physical layer data packet size corresponding to an encoding rate;
selecting a physical layer packet size corresponding to a related encoding rate from the set of possible physical layer data packet sizes;
determining a maximum size of a compressed header based on supported compression schemes identified as usable within the wireless communication system;
partitioning a frame of multimedia data into partitions based on the physical layer packet size and maximum size of the compressed header, wherein partition sizes are selected so that an aggregate size of a partition plus the maximum size of the compressed header match the physical layer packet size; and
encoding the partition at the related encoding rate, appending the compressed header and transmitting the encoded partition with the appended header.

32. The non-transitory computer readable media as defined in claim 31, wherein the multimedia data is at least one of a variable bit rate stream or a video stream 33. The non-transitory computer readable media as defined in claim 31, wherein determining the set of possible physical layer data packet sizes and the maximum size of the compressed header is determined by negotiation between participants in a communication session.

34. The non-transitory computer readable media as defined in claim 31, wherein the communication channels are at least one of CDMA channels, GSM channels, EDGE channels or GPRS channels.

35. The non-transitory computer readable media as defined in claim 31, wherein the header is compressed in accordance with at least one of robust header compression techniques or zero byte header compression techniques.

36. An apparatus configured to transmit multimedia data over a wireless communication system, the apparatus comprising:
means for determining a set of possible physical layer data packet sizes of available communication channels, each possible physical layer data packet size corresponding to an encoding rate;
means for selecting a physical layer packet size corresponding to a related encoding rate from the set of possible physical layer data packet sizes;
means for determining a maximum size of a compressed header based on supported compression schemes identified as usable within the wireless communication system;
partitioning a frame of multimedia data into partitions based on the physical layer packet size and maximum size of the compressed header, wherein partition sizes are selected so that an aggregate size of a partition plus the maximum size of the compressed header match the physical layer packet size; and
means for encoding the partition at the related encoding rate, appending the compressed header and transmitting the encoded partition with the appended header.

37. The apparatus as defined in claim 36, wherein the multimedia data is at least one of a variable bit rate stream or a video stream.

38. The apparatus as defined in claim 36, wherein the means for determining the set of possible physical layer data packet sizes and the maximum size of the compressed header determines by negotiation between participants in a communication session.

39. The apparatus as defined in claim 36, wherein the communication channels are at least one of CDMA channels, GSM channels, EDGE channels or GPRS channels.

40. The apparatus as defined in claim 36, wherein the header is compressed in accordance with at least one of robust header compression techniques or zero byte header compression techniques.

41. An apparatus configured to transmit data over a wireless communication system, comprising:
means for determining a physical layer packet size of the wireless communication system from a set of physical layer packet sizes related to data encoding rates available;
means for determining a maximum size of a compressed header based on supported compression schemes identified as usable within the wireless communication system; and
means for partitioning an information unit based on the physical layer packet size and maximum size of the compressed header, wherein partitions are sized such that after a partition is encoded, an aggregate size of each encoded partition and an associated compressed header is no greater than the physical layer packet size.

42. The apparatus of claim 41, wherein the information unit comprises at least one of multimedia data or video data.

43. The apparatus of claim 41, wherein the header is compressed in accordance with at least one of robust header compression techniques or zero-byte header compression techniques.

44. The apparatus of claim 41, wherein the means for determining the physical layer packet size include means for determining the size of the physical layer packet and the maximum size of the compressed header by negotiation between participants in a communication session.

45. The apparatus of claim 41, wherein the wireless communication system is at least one of a CDMA system, a GSM system, an EDGE system or a GPRS system.

* * * * *